United States Patent
Masutani (10) Patent No.: US 8,109,568 B2
(45) Date of Patent: Feb. 7, 2012

(54) VEHICLE SEAT (75) Inventor: Eiji Masutani, Shioya-gun (JP)

(73) Assignee: TS Tech Co., Ltd., Saitama-ken (JP)

( * ) Notice: Subject to any disclaimer, the term of this patent is extended or adjusted under 35 U.S.C. 154(b) by 220 days.

(21) Appl. No.: 12/278,465

(22) PCT Filed: Feb. 6, 2007

(86) PCT No.: PCT/JP2007/052057
§ 371 (c)(1),
(2), (4) Date: May 8, 2009

(87) PCT Pub. No.: WO2007/091575
PCT Pub. Date: Aug. 16, 2007

(65) Prior Publication Data
US 2010/0001559 A1    Jan. 7, 2010

(30) Foreign Application Priority Data

Feb. 6, 2006  (JP) .................................. 2006-029079
Feb. 6, 2006  (JP) .................................. 2006-029080

(51) Int. Cl.
*B62J 1/00* (2006.01)
(52) U.S. Cl. ................ 297/216.15; 297/216.1; 297/470; 297/473; 297/480
(58) Field of Classification Search ............... 297/216.1, 297/216.15, 470, 473, 480
See application file for complete search history.

(56) References Cited

U.S. PATENT DOCUMENTS

| | | | | |
|---|---|---|---|---|
| 3,186,760 A | * | 6/1965 | Lohr et al. | 297/216.18 |
| 4,257,626 A | * | 3/1981 | Adomeit | 280/806 |
| 4,738,485 A | * | 4/1988 | Rumpf | 297/216.19 |
| 5,366,269 A | * | 11/1994 | Beauvais | 297/216.19 |
| 5,567,006 A | * | 10/1996 | McCarthy | 297/216.15 |
| 5,908,219 A | * | 6/1999 | Bohmler | 297/216.1 |
| 6,050,635 A | * | 4/2000 | Pajon et al. | 297/216.1 |
| 6,398,285 B2 | * | 6/2002 | Motozawa et al. | 296/68.1 |
| 6,582,023 B2 | * | 6/2003 | Houston et al. | 297/470 |
| 6,648,409 B1 | * | 11/2003 | Laporte | 297/216.1 |
| 6,682,141 B2 | * | 1/2004 | Reynolds et al. | 297/216.1 |
| 6,755,469 B2 | * | 6/2004 | Akaike et al. | 297/344.15 |
| 6,851,753 B2 | * | 2/2005 | Akaike et al. | 297/344.17 |

FOREIGN PATENT DOCUMENTS

JP   2001130354   5/2001
JP   2003040013   2/2003

* cited by examiner

Primary Examiner — Laurie Cranmer
(74) Attorney, Agent, or Firm — Browdy and Neimark, PLLC (57) ABSTRACT A vehicle seat comprises a seat bottom, a seat back pivotably attached to the seat bottom, a seat belt. The seat bottom has a support frame to be attached to a vehicle body, and a bottom cushion supported by the support frame. A pretensioner is disposed between the bottom cushion and the support frame to move the bottom cushion rearward with respect to the support frame when the unpreferable external force is generated. When the pretensioner is actuated, the bottom cushion moves rearward, and a moving distance S of a tip anchor and a tongue anchor is set larger than a moving distance T of the bottom cushion.

2 Claims, 9 Drawing Sheets

VEHICLE SEAT

TECHNICAL FIELD

The present invention relates to a vehicle seat for effectively protecting a vehicle seat occupant when an unpreferable external force acts on a vehicle body and abruptly moves the vehicle seat occupant forward, and more particularly to a vehicle seat for moving a bottom cushion rearward in quick response to generation of an unpreferable external force.

BACKGROUND ART

Patent Document 1 discloses a conventional technique for quickly moving a vehicle seat (including a seat back and a seat bottom) rearward when an unpreferable external force acts on a vehicle body.

Patent Document 1: JP 2001-130354A

DISCLOSURE OF THE INVENTION

The known prior art has a problem in that both a seat back and a seat bottom of the vehicle seat move rearward. To move both the seat back and the seat bottom rearward, it is necessary to secure sufficient strength to a structure for moving them, and a large force and a large space are necessary to move them. Accordingly, the prior art is very disadvantageous in weight and size, and further it is difficult to employ the known technique in a small vehicle in which it is difficult to secure a space.

Further, although a space behind the vehicle seat must be used as a dead space for receiving the vehicle seat in emergency, when a vehicle seat occupant sits on a rear seat contrary to the restraint, there is a possibility that the seat occupant sitting on the rear seat is secondarily injured by the vehicle seat that moves rearward in emergency.

Accordingly, an object of the present invention is to provide an improved vehicle seat which overcomes the above problem.

For this object, in the present invention, when an unpreferable external force acts on a vehicle body, only a bottom cushion is substantially moved rearward without moving a seat back and at the same time a seat belt is further tightened so that a vehicle seat occupant can be more securely protected.

BEST MODE FOR CARRYING OUT THE INVENTION

Figure 1:
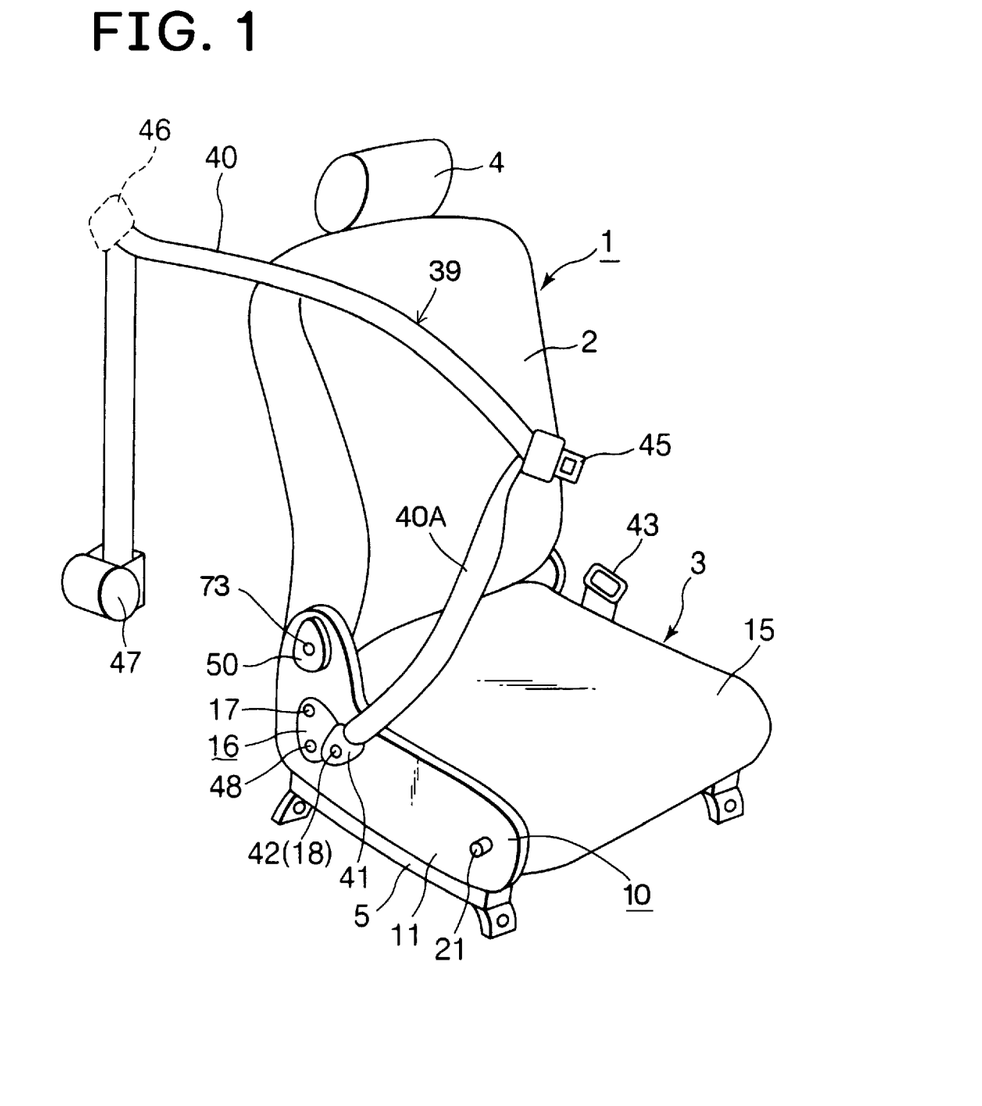
FIG. 1 is a perspective view showing an overall vehicle seat according to the present invention.
Figure 2:
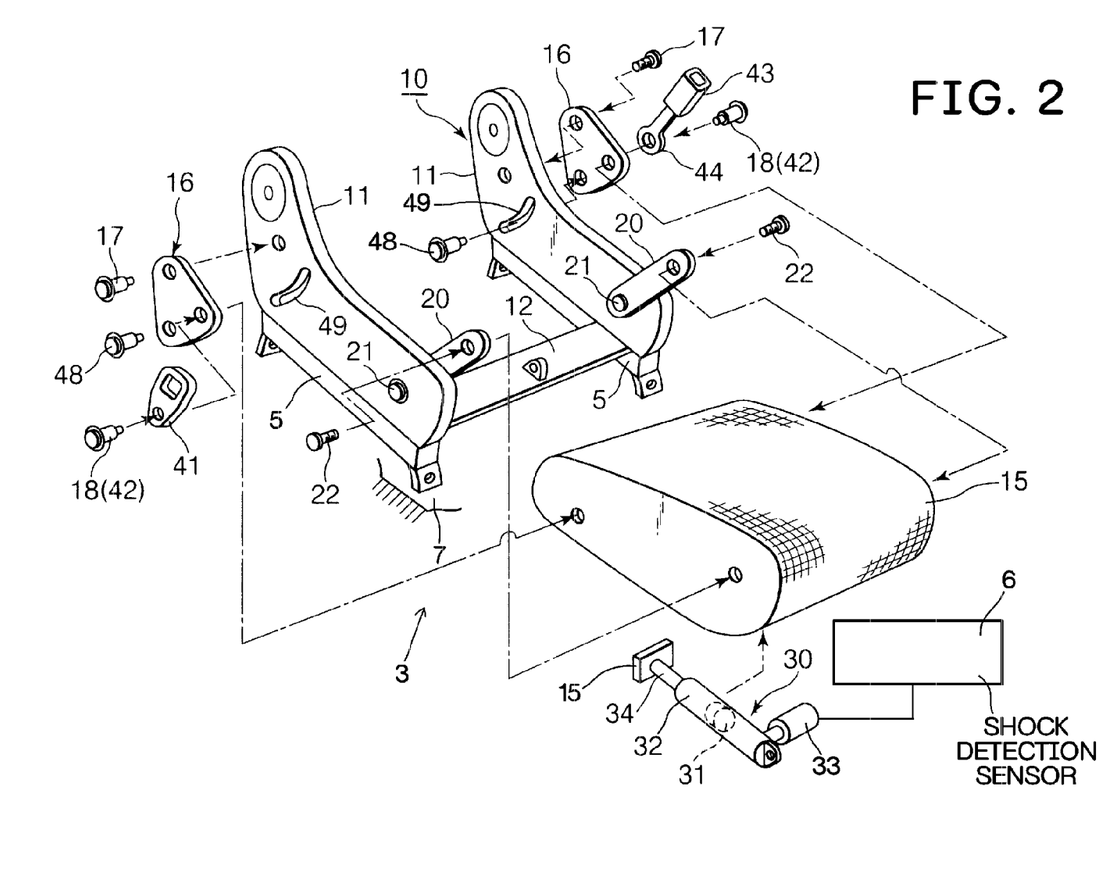
FIG. 2 is an exploded perspective view of the vehicle seat.

Embodiments of the present invention will be explained referring to the drawings. A vehicle seat 1 of the present invention has a seat bottom 3, a seat back 2 journaled to the seat bottom 3 by shafts 73, and a head rest 4 disposed to an upper portion of the seat back 2. The seat back 2 is held at an optional angle with respect to the seat bottom 3 by a reclining mechanism 50. The seat bottom 3 has a support frame 10 and a bottom cushion 15, and the support frame 10 is attached to a vehicle body 7 (FIG. 2) through a known slide mechanism 5.

The support frame 10 has a pair of vertical plates 11 and a coupling member 12 interposed between the vertical plates 11, 11. The bottom cushion 15 is substantially interposed between the vertical plates 11, 11. In a first embodiment shown in FIGS. 1 to 7, a front link arm 20 is pivotably attached to a front side of each of the vertical plates 11 of the support frame 10 by a shaft 21, and a front side of the bottom cushion 15 is attached to an end of the front link arm 20 by a shaft 22.

A triangular rear link arm 16 is pivotably attached to a rear side of each of the vertical plates 11 of the support frame 10 by a shaft 17, and a rear portion of the bottom cushion 15 is pivotably attached to the rear link arm 16 by a coupling shaft 18.

Figure 3:
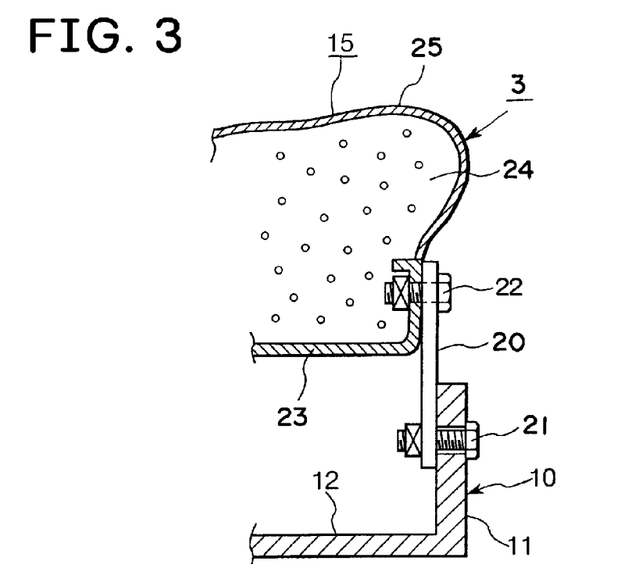
FIG. 3 is a sectional view of a seat bottom of the vehicle seat.
Figure 4:
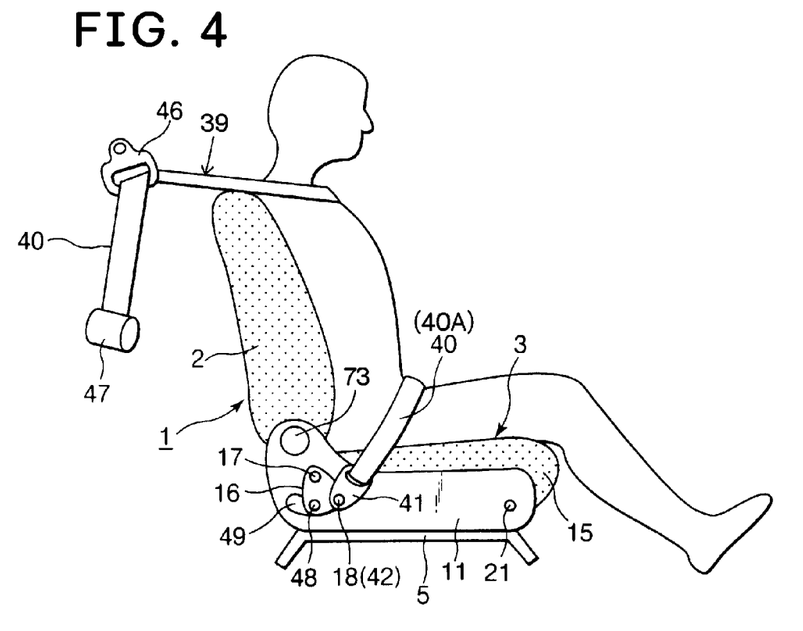
FIG. 4 is a side elevational view showing the vehicle seat and a vehicle seat occupant in an ordinary state.
Figure 5:
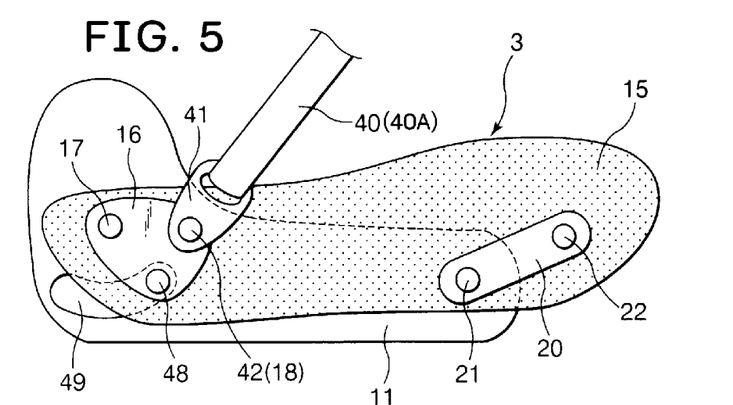
FIG. 5 is a side elevational view showing the relation between a bottom cushion and a support frame before collision.
Figure 6:
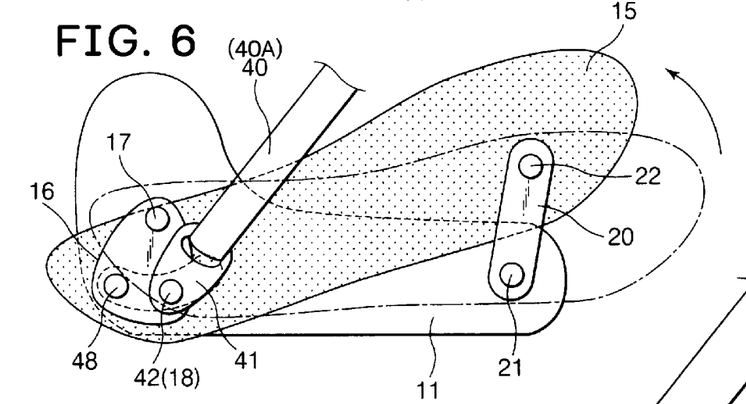
FIG. 6 is a side elevational view showing the relation between the bottom cushion and the support frame after collision.

As shown in FIG. 3, the bottom cushion 15 has a cushion frame 23, a cushion material 24 attached to the cushion frame 23, and a surface skin 25 surrounding the outer periphery of the cushion material 24.

A pretensioner 30 is disposed below the bottom cushion 15 to move the bottom cushion 15 relatively rearward with respect to the vehicle body 7 (the support frame 10 or the seat back 2). The pretensioner 30 has a cylinder 32, a piston 31, and a gas generator 33 for supplying a large amount of gas into the cylinder 32 to push out the piston 31. A piston rod 34 is coupled with an end of the piston 31 by a coupling pin or the like as necessary. The base portion of the cylinder 32 is attached to a coupling member 12 of the support frame 10 (or the bottom cushion 15), and the end of the piston 31 is attached to the bottom cushion 15 (or the support frame 10). When the piston 31 is pushed out from the cylinder 32, the bottom cushion 15 is moved relatively rearward with respect to the vehicle body 7.

When a shock detection sensor 6, which is disposed at a desired position of the vehicle body 7, detects a shock (unpreferable external force that abruptly moves a vehicle seat occupant forward), the gas generator 33 instantly generates a large amount of gas and moves the piston 31 rearward from the cylinder 32.

When a shock detection sensor 6 disposed at a desired position of the vehicle body 7 detects a shock (unpreferable external force that abruptly moves a vehicle seat occupant forward), the gas generator 33 instantly generates a large amount of gas to move the piston 31 rearward from the cylinder 32. When the gas generator 33 is operated, the bottom cushion 15 moves from a position shown in FIG. 5 to a position shown in FIG. 6, a front side of the bottom cushion 15 moves rearward while moving upward, and a rear side thereof moves rearward while moving downward. The motion of the bottom cushion 15 will be described later in detail.

The vehicle seat 1 has a seat belt mechanism 39. The seat belt mechanism 39 has a belt retractor 47, a seat belt 40, a shoulder belt anchor 46, which holds an intermediate portion of the seat belt 40 at a predetermined height, a tongue plate 45 coupled with the seat belt 40 in a middle portion thereof, a tongue anchor 43 with which the tongue plate 45 is detachably engaged, a tip anchor 41 to which an end of the seat belt 40 is fixed. When a strong load acts on the seat belt 40 by an accident or the like, the retractor 47 controls pulling out of the seat belt 40. The retractor 47 is fixed to the vehicle body 7 or to the seat back 2. The tip anchor 41 and the tongue anchor 43 are attached to the rear link arms 16, 16, respectively by shafts 42, 42. The coupling shafts 18, 18 can be used in place of the shafts 42, 42.

Arc-shaped guide grooves 49, 49 are formed to the vertical plates 11, 11 about the shafts 17, 17. The guide grooves 49, 49 guide shafts 48, 48 fixed to the rear link arms 16, 16.

Figure 7:
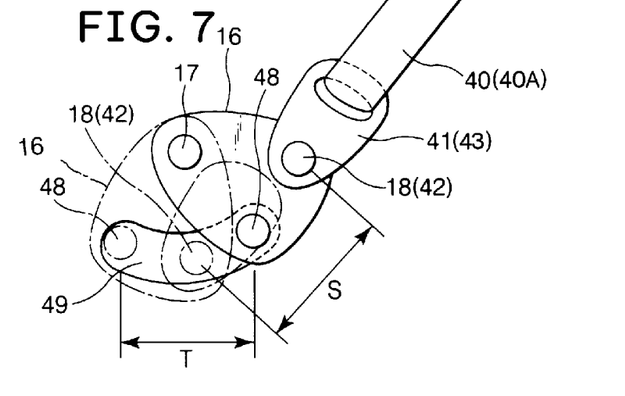
FIG. 7 is an explanatory view showing a moving distance T of the bottom cushion and a moving distance S of a tip anchor.
Figure 8:
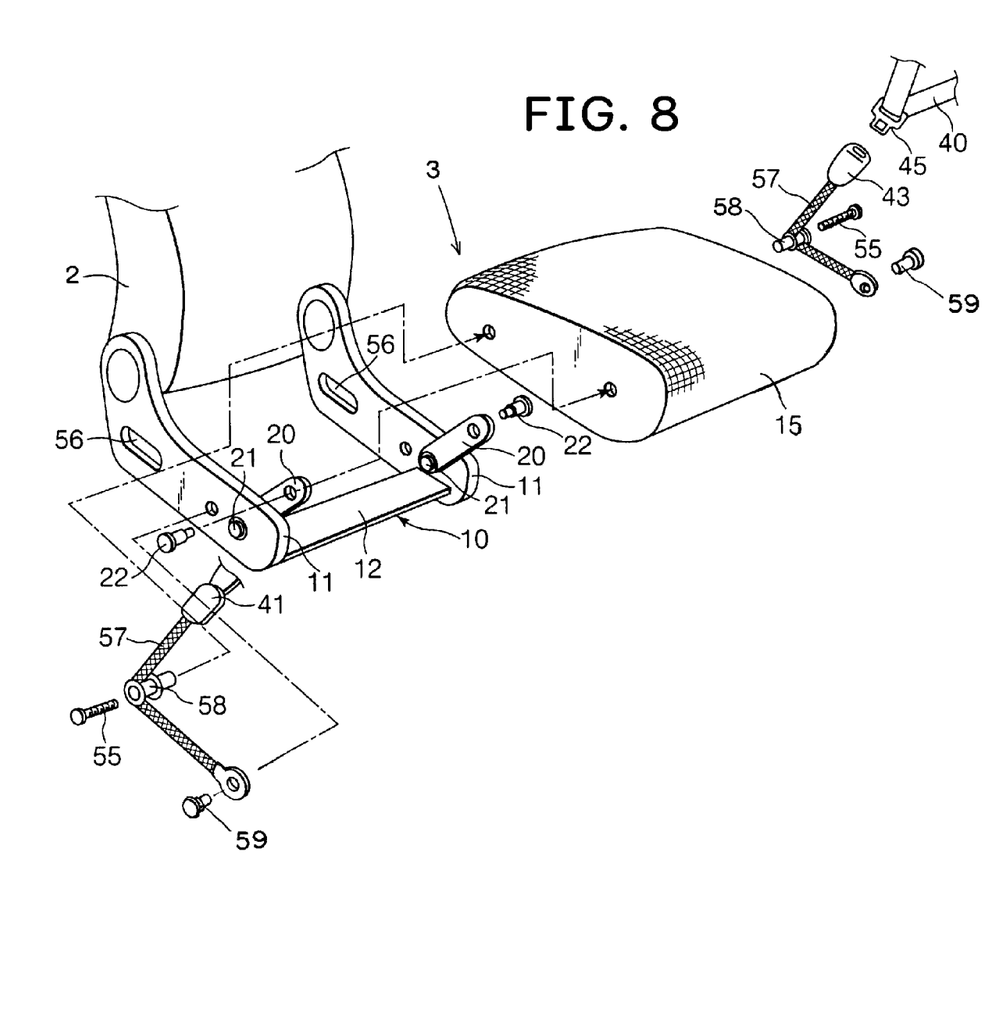
FIG. 8 is an exploded perspective view of a vehicle seat based on a second embodiment of the present invention.
Figure 9:
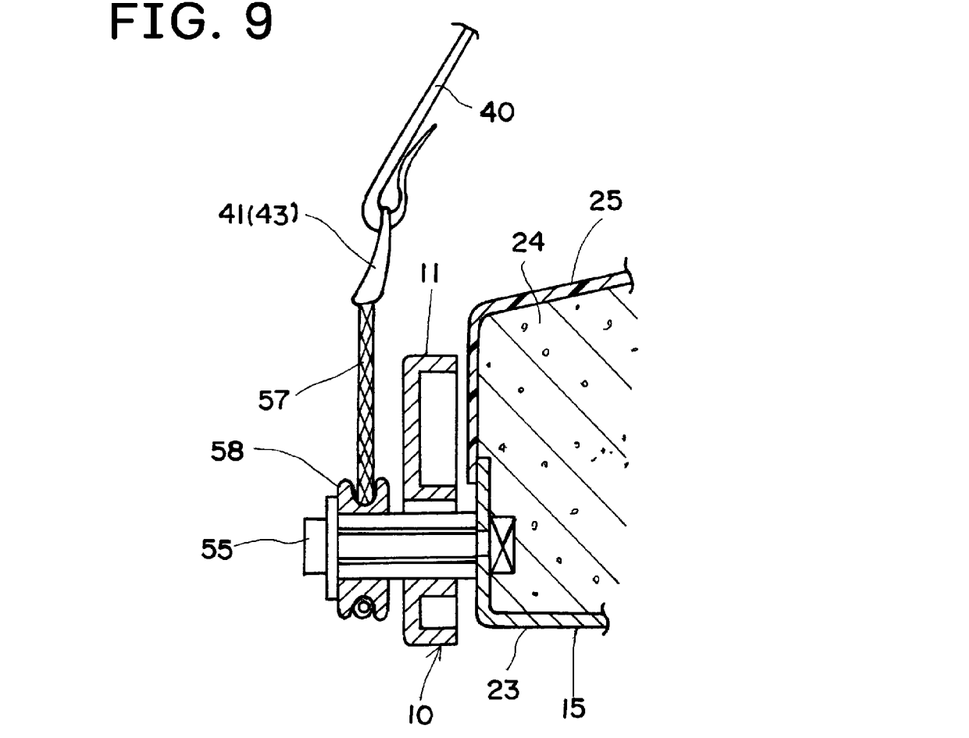
FIG. 9 is a sectional view of a seat bottom of the vehicle seat.
Figure 10:
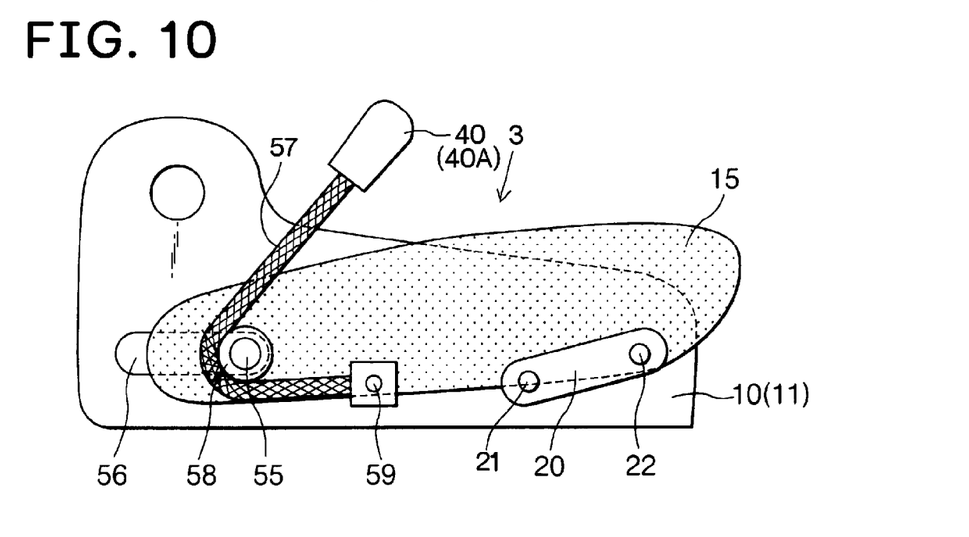
FIG. 10 is a side elevational view showing the relation between a bottom cushion and a support frame before collision.
Figure 11:
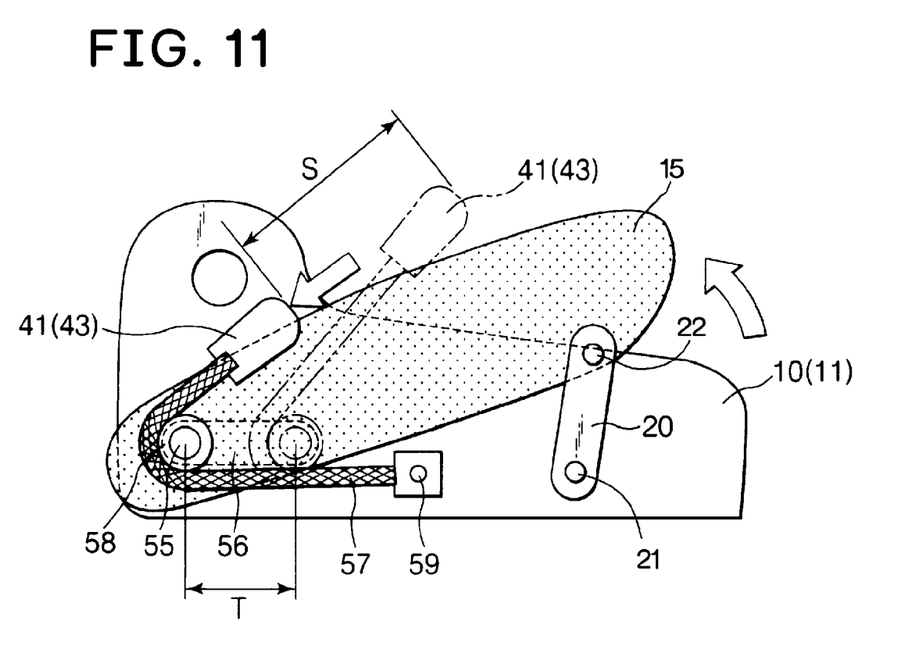
FIG. 11 is a side elevational view showing the relation between the bottom cushion and the support frame after collision.
Figure 12:
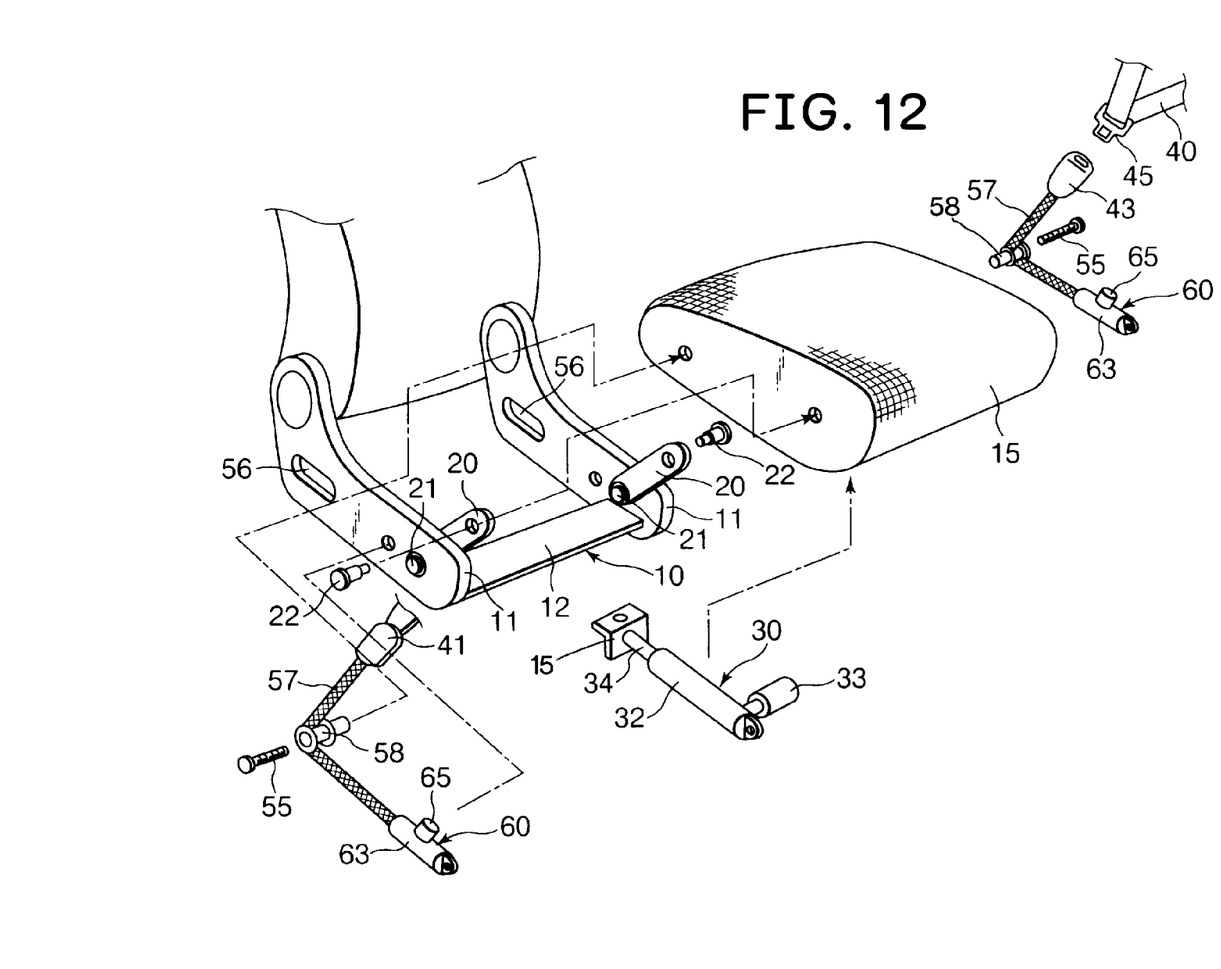
FIG. 12 is an exploded perspective view of a vehicle seat based on a third embodiment of the present invention.
Figure 13:
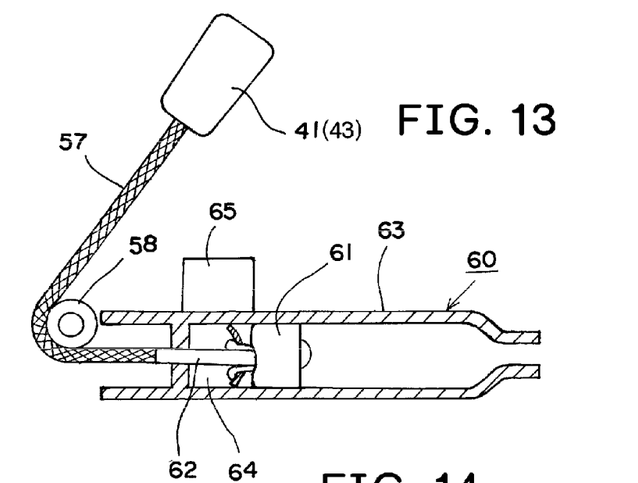
FIG. 13 is a side elevational view showing a seat belt pretensioner and a tip anchor of the third embodiment.

As described above, when the gas generator 33 is operated, a rear side of the bottom cushion 15 moves rearward while moving downward as shown in FIG. 7. A supplementary explanation for this is given below. When the gas generator 33 is operated, the coupling shafts 18 fixed to the bottom cushion 15 pivot the rear link arms 16 clockwise about the shafts 17, thereby the coupling shafts 18 (which correspond to the tip anchor 41 and the tongue anchor 43) are moved a distance S. With this operation, the seat belt 40 is emergently tightened by the distance S. That is, after an accident or the like occurs, the seat belt 40 can be further tightened instantly than an ordinary state. With this operation, it can be expected to effectively protect a vehicle seat occupant by increasing the restraining function of the seat belt mechanism 39 as compared to the ordinary state, thereby an unpreferable space between the vehicle seat occupant and a lap belt 40A of the seat belt 40 is suppressed.

Further, when the gas generator 33 is operated, the front side of the bottom cushion 15 is moved upward. With this operation, the forward movement of the vehicle seat occupant can be further suppressed.

The amount of rearward movement of the bottom cushion 15 is equal to a substantially horizontal distance T. When the distance S is set longer than the distance T, the vehicle seat occupant is protected by the seat belt mechanism 39 by a restraint force stronger than that before the accident occurs at the time the bottom cushion 15 is moved rearward by the action of the pretensioner 30. To set the distance S longer than the distance T, it is only sufficient to design these distances so that the distance T corresponds to a short side of a triangle and the distance S corresponds to a long side thereof.

FIGS. 8 to 11 show a second embodiment of the present invention, in which mounting shafts 55 are provided at the rear portion of the bottom cushion 15 and inserted into rear slots 56 disposed to the vertical plates 11 of the support frame 10 so as to move in a front-and-back direction. The tip anchor 41 and the tongue anchor 43 are locked to respective one ends of wire cables 57 and intermediate portions of the wire cables 57 are abutted on rollers 58 disposed to the outer peripheries of the mounting shafts 55. The other ends of the wire cables 57 are locked to the vertical plates 11 by pins 59.

When the bottom cushion 15 is moved rearward by the action of the pretensioner 30, the mounting shafts 55 (and the rollers 58) are also moved rearward at the same time. With this operation, the tip anchor 41 and the tongue anchor 43 are pulled a distance that is substantially twice the amount of rearward movement of the mounting shafts 55. As a result, the seat belt 40 is efficiently tightened and the vehicle seat occupant is more securely restrained by the seat belt 40.

FIGS. 12 to 15 show a third embodiment of the present invention, in which the tip anchor 41 and the tongue anchor 43 are locked to respective one ends of the wire cables 57, and intermediate portions of the wire cables 57 are abutted on the rollers 58 disposed on the mounting shafts 55, and the other ends of the wire cables 57 are coupled with seat belt pretensioner 60.

Figure 14:
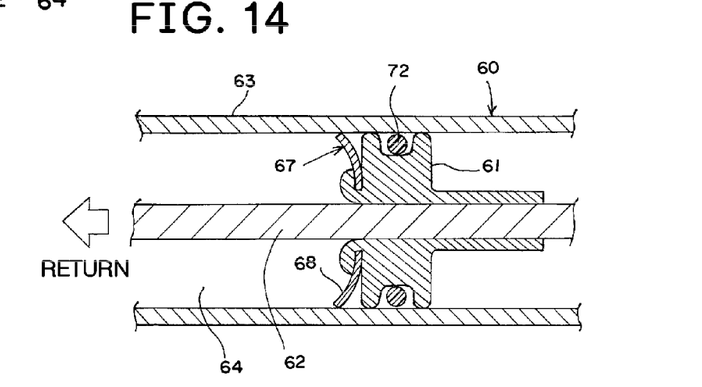
FIG. 14 is an enlarged sectional view of the seat belt pretensioner.

The pretensioner 60 has a cylinder 63, a piston 61, and a piston rod 62, and each of the wire cables 57 is coupled with the piston rod 62. A gas chamber 64 is formed in the cylinder 63, and a large amount of gas from a gas generator 65, which is operated in response to a signal from the shock detection sensor 6, is supplied into the gas chamber 64. When the gas is supplied into the gas chamber 64, the tip anchor 41 and the tongue anchor 43 are pulled through the wire cables 57 and the seat belt 40 is placed in a strongly tightened state, thereby the vehicle seat occupant is more securely restrained by the seat belt 40. As described above, the third embodiment has a feature in that it is provided with the dedicated pretensioner 60 for tightening the seat belt 40 by pulling the tip anchor 41 and the tongue anchor 43 in addition to the pretensioner 30 for moving the bottom cushion 15 rearward.

Figure 15:
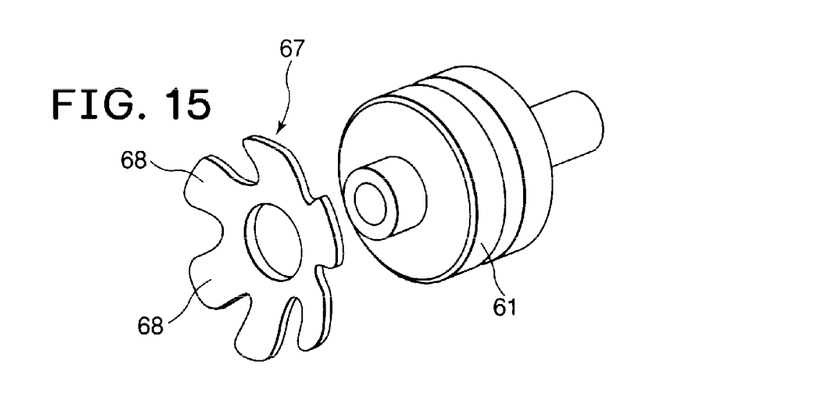
FIG. 15 is a perspective view of a one-way lock of the seat belt pretensioner.

The piston 61 has a one-way lock 67. The one-way lock 67 has a plurality of claw-shaped projections 68 and the claw-shaped projections 68 are engaged with the inner wall of the cylinder 63 so that the piston 61 is regulated from moving leftward in FIG. 13 beyond a predetermined position. A seal ring 72 is disposed around the outer periphery of the piston 61.

As described above, according to the present invention, when the shock detection sensor 6 detects an unpreferable external force which abruptly moves the vehicle seat occupant forward, the bottom cushion 15 moves rearward as well as the seat belt 40 is further tightened, and thus it is expected that the vehicle seat occupant can be more securely protected.

Further, according to the present invention, since only the bottom cushion 15 can be moved rearward without substantially moving the seat back 2 of the vehicle seat 1, even a vehicle, which cannot secure a large space for movement behind the vehicle seat 1, can employ the vehicle seat of the present invention having the excellent function. In other words, in the present invention, almost no dead space is made behind the vehicle seat 1.

The invention claimed is:
1. A vehicle seat comprising a seat bottom;
a seat back pivotably attached to the seat bottom;
a seat belt;
said seat bottom having a support frame to be attached to a vehicle body, and a bottom cushion supported by the support frame; said support frame being arranged not to be moved in a front-and-back direction with respect to the vehicle body by an unpreferable external force which abruptly moves a vehicle seat occupant forward;
said bottom cushion being arranged to be moveable in a front-and-back direction with respect to the support frame;

a pretensioner disposed between the bottom cushion and the support frame to move the bottom cushion rearward with respect to the support frame when the unpreferable external force is generated;

wherein a tip anchor and a tongue anchor of the seat belt are arranged to move in conjunction with the bottom cushion moving rearward to further tighten the seat belt when the pretensioner is actuated;

wherein a moving distance S of the tip anchor and the tongue anchor when the pretensioner is actuated is set larger than a moving distance T of the bottom cushion; and further comprising rear link arms journaled to the support frame, wherein a rear portion of the bottom cushion is coupled with the rear link arms so that the rear link arms are pivoted as the bottom cushion moves rearward, and wherein the tip anchor and the tongue anchor are fixed to the rear link arms so that the seat belt is further tightened when the rear link arms are pivoted.

2. A vehicle seat comprising:

a seat bottom;

a seat back pivotably attached to the seat bottom;

a seat belt;

said seat bottom having a support frame to be attached to a vehicle body, and a bottom cushion supported by the support frame;

said support frame being arranged not to be moved in a front-and-back direction with respect to the vehicle body by an unpreferable external force which abruptly moves a vehicle seat occupant forward; said bottom cushion being arranged to be moveable in a front-and-back direction with respect to the support frame;

a pretensioner disposed between the bottom cushion and the support frame to move the bottom cushion rearward with respect to the support frame when the unpreferable external force is generated;

wherein a tip anchor and a tongue anchor of the seat belt are arranged to move in conjunction with the bottom cushion moving rearward to further tighten the seat belt when the pretensioner is actuated;

wherein a moving distance S of the tip anchor and the tongue anchor when the pretensioner is actuated is set larger than a moving distance T of the bottom cushion; and wherein the tip anchor and the tongue anchor are connected to seat belt pretensioner through wire cables, wherein when the unpreferable external force is generated, the bottom cushion is moved rearward by the pretensioner and the tip anchor and the tongue anchor are moved by the seat belt pretensioner in a direction where the seat belt is tightened.

* * * * *